United States Patent
Dwivedi et al.

(10) Patent No.: US 12,532,291 B2
(45) Date of Patent: Jan. 20, 2026

(54) RECEIVING RADIO NODE, RADIO DEVICE, NETWORK NODE AND METHODS FOR POSITIONING THE RADIO DEVICE

(71) Applicant: Telefonaktiebolaget LM Ericsson (publ), Stockholm (SE)

(72) Inventors: Satyam Dwivedi, Solna (SE); Jonas Medbo, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 366 days.

(21) Appl. No.: 18/245,041

(22) PCT Filed: Sep. 15, 2020

(86) PCT No.: PCT/SE2020/050860
§ 371 (c)(1),
(2) Date: Mar. 13, 2023

(87) PCT Pub. No.: WO2022/060258
PCT Pub. Date: Mar. 24, 2022

(65) Prior Publication Data
US 2023/0397156 A1    Dec. 7, 2023

(51) Int. Cl.
*H04W 64/00*    (2009.01)

(52) U.S. Cl.
CPC .................. *H04W 64/006* (2013.01)

(58) Field of Classification Search
CPC ..... H04W 64/006; H04W 4/02; H04W 64/00; H04W 4/029; H04W 64/003;

(Continued)

(56) References Cited

U.S. PATENT DOCUMENTS

2006/0220794 A1   10/2006   Zhu
2006/0240839 A1*  10/2006   Chen .................. G01S 19/48
                                              455/12.1
2007/0207816 A1*  9/2007    Spain .................. H04W 64/00
                                              455/456.1

(Continued)

FOREIGN PATENT DOCUMENTS

EP    0899682 A2    3/1999
WO    02/35252 A2   5/2002

(Continued)

OTHER PUBLICATIONS

International Search Report and Written Opinion mailed May 24, 2021 for International Application No. PCT/SE2020/050860, 12 pages.

(Continued)

*Primary Examiner* — Nimesh Patel
(74) *Attorney, Agent, or Firm* — Sage Patent Group

(57) ABSTRACT

A method performed by a receiving radio node for positioning a radio device is provided. The receiving radio node receives a first signal from a transmitting radio node, and measures a time of arrival of the first signal. The first signal is also received by a radio device. The receiving radio node further receives a second signal from the radio device. The second signal is the first signal that has been scattered and frequency modulated by the radio device when the first signal was received by the radio device. The receiving radio node measures a time of arrival of the second signal. The receiving radio node then calculates a Time Difference Of Arrival (TDOA) based on the measured time of arrival of the first signal and the measured time of arrival of the second signal.

17 Claims, 17 Drawing Sheets

Method in receiving radio node 111

(58) Field of Classification Search
CPC ....... H04W 4/023; H04W 4/027; G01S 7/006; G01S 13/765; G01S 5/06; G01S 5/0036; G01S 13/878; G01S 13/003; G01S 5/02; G01S 5/0263; G01S 1/08; G01S 5/02213; G01S 5/0273; G01S 5/0249; G01S 5/02521; G01S 5/0284; G01S 5/02524; G01S 5/017; G01S 11/06; G01S 5/02216; G01S 5/0252; G01S 5/0268; G01S 19/48; G01S 5/0242; G01S 5/14; G01S 19/42; G01S 5/0009; G01S 5/0244; G01S 13/04; G01S 13/56; G01S 13/87; G01S 3/023; G01S 3/782; G01S 5/08; G01S 5/12; G01S 3/14; G01S 5/011; G01S 5/0258; G01S 5/24; G01S 7/415; G01S 13/08; G01S 13/36; G01S 13/62; G01S 2205/008; G01S 5/00; G01S 5/22; G01S 5/26; G01S 5/30; Y02D 30/70; G06N 3/08; G06N 20/10; G06N 3/0455; G06N 3/0464; G06N 3/0475; G06N 3/094; H04B 17/318; H04B 17/27; H04B 10/60; H04B 17/345; H04B 17/309

See application file for complete search history.

(56) References Cited

U.S. PATENT DOCUMENTS

| | | | |
|---|---|---|---|
| 2011/0039578 A1* | 2/2011 | Rowitch | G01S 13/767 455/456.1 |
| 2020/0116817 A1 | 4/2020 | Chuo et al. | |
| 2020/0196298 A1* | 6/2020 | Edge | H04W 4/029 |

FOREIGN PATENT DOCUMENTS

| | | |
|---|---|---|
| WO | 2016/044912 A1 | 3/2016 |
| WO | 2018/162885 A1 | 9/2018 |
| WO | 2019112647 A1 | 6/2019 |

OTHER PUBLICATIONS

Fu, Jianbin et al; "UWB-Over-Fiber Sensor Network for Accurate Localization Based on Optical Time-Division Multiplexing"; 12th International Conference on Optical Communications and Networks, ICOCN 2013; Jul. 26, 2013; 4 pages.

Extended European Search Report mailed Jun. 10, 2024 for European Patent Application No. 20954266.1, 7 pages.

* cited by examiner

Method in radio device 120

601. Receive from each of one or more receiving radio nodes, a calculated Time Difference Of Arrival (TDOA) based on a first signal from a transmitting node and a second signal being scattered and frequency modulated by a radio device.

602. Calculate the position of the radio device based on the received one or more measured TDOAs.

Method in network node 130

Fig. 6

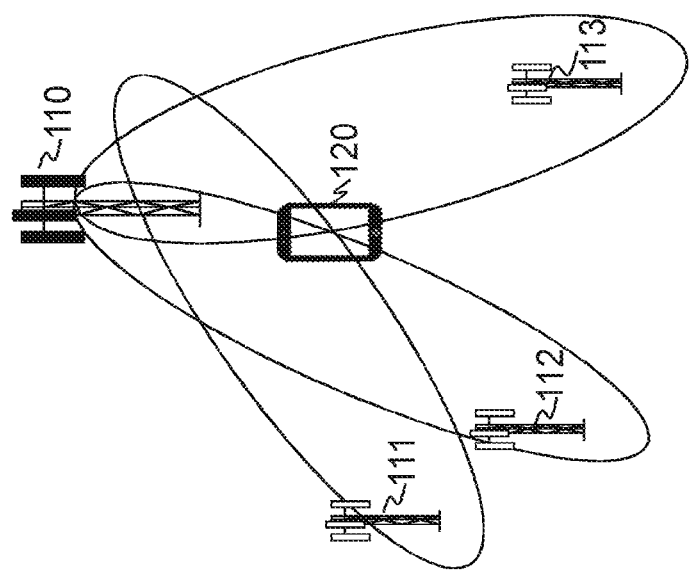
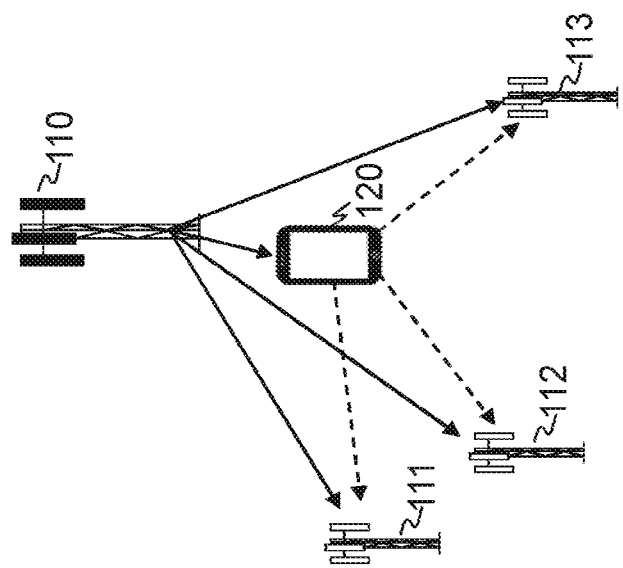
Fig. 9

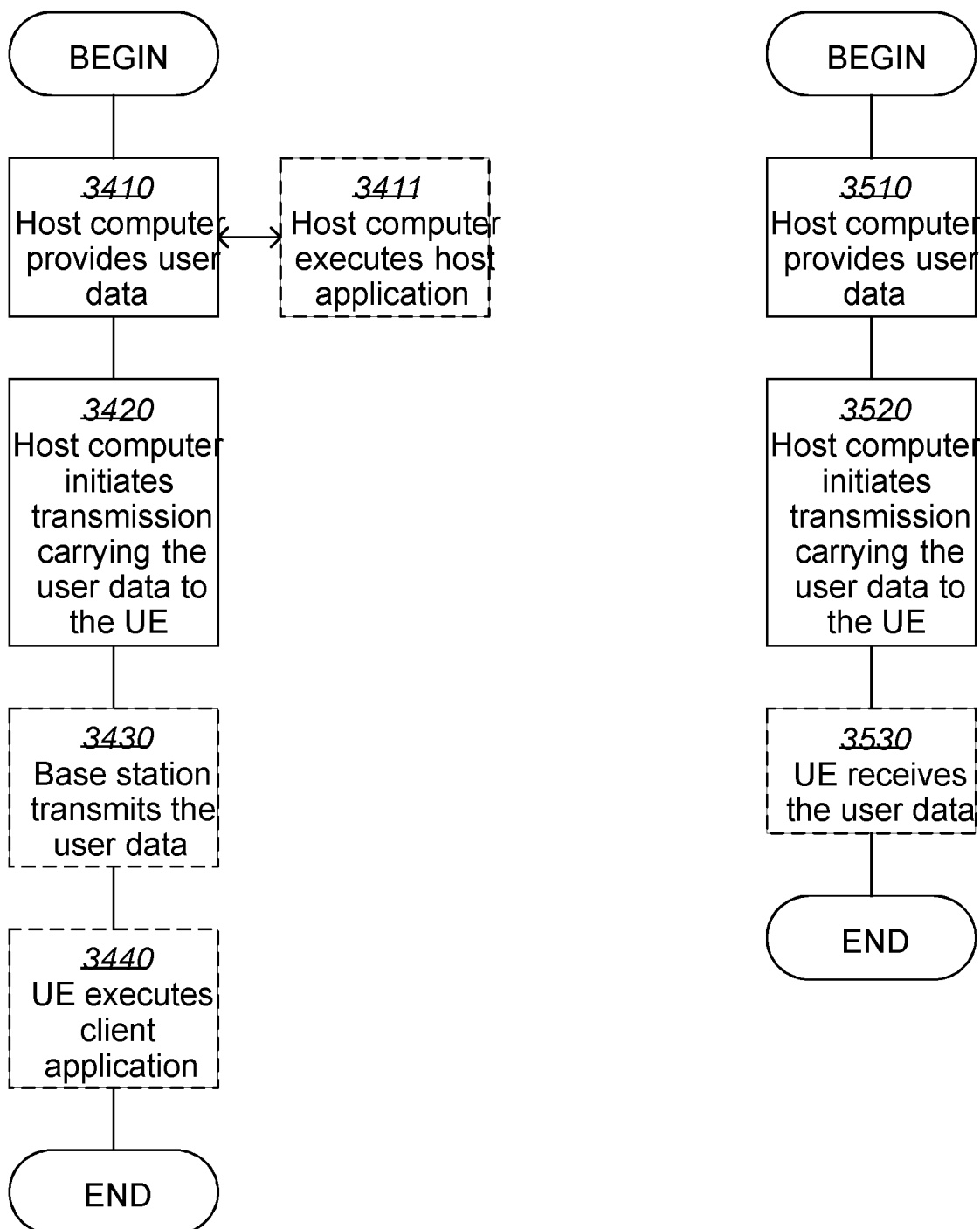

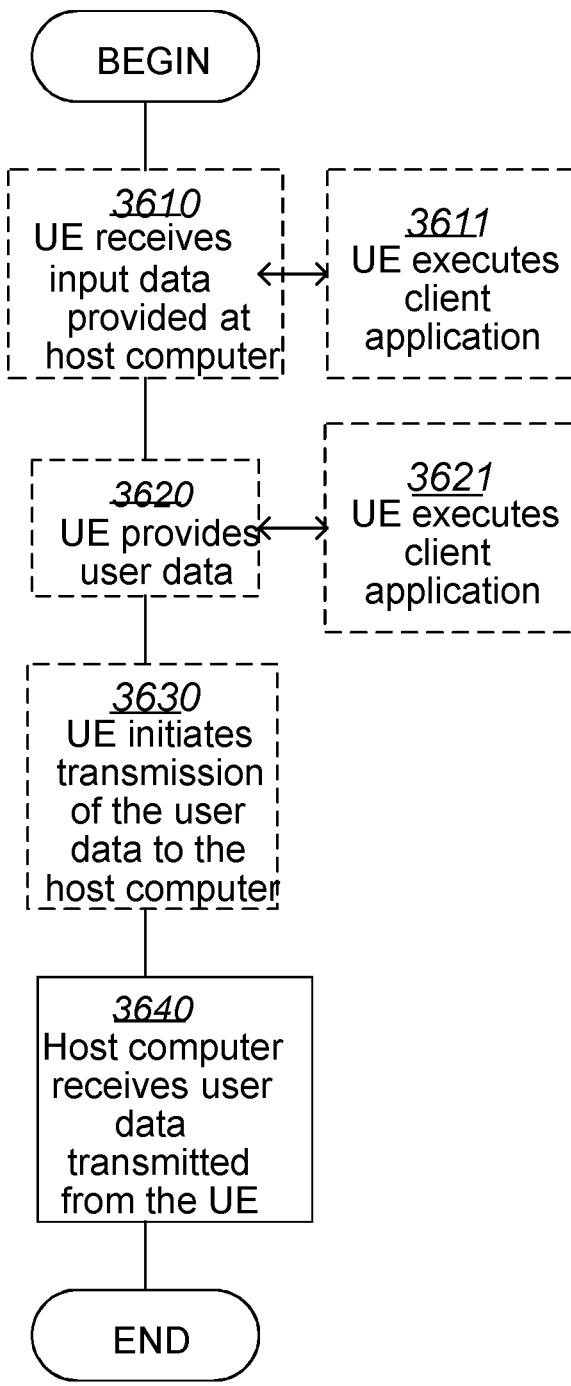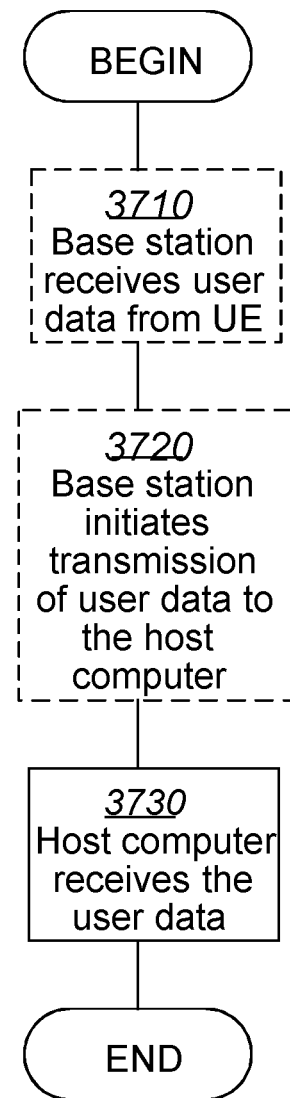
FIG 18
FIG 19

RECEIVING RADIO NODE, RADIO DEVICE, NETWORK NODE AND METHODS FOR POSITIONING THE RADIO DEVICE

CROSS-REFERENCE TO RELATED APPLICATIONS

This application is a 35 U.S.C § 371 national stage application for International Application No. PCT/SE2020/050860, entitled "RECEIVING RADIO NODE, RADIO DEVICE, NETWORK NODE AND METHODS FOR POSITIONING THE RADIO DEVICE", filed on Sep. 15, 2020, assigned to the assignee hereof, and expressly incorporated herein by reference.

TECHNICAL FIELD

Embodiments herein relate to a receiving radio node, a radio device, a network node, and methods therein. In some aspects, they relate to positioning the radio device.

Embodiments herein further relates to computer programs and carriers corresponding to the above methods and network nodes.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or Next Generation (NG). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Positioning has been a topic in LTE standardization since 3GPP Release 9. The primary objective is to fulfill regulatory requirements for emergency call positioning. Positioning in NR is proposed to be supported by an architecture as shown in FIG. 1. FIG. 1 depicts NG-RAN Release-15 Location Services (LCS) protocols. Location Management Function (LMF) is the location server in NR. There are also interactions between the location server and the gNodeB via the NR Positioning Protocol A (NRPPa) protocol. The interactions between the gNodeB and the UE are supported via the Radio Resource Control (RRC) protocol.

In FIG. 1,
  E-SMLC means Evolved Serving Mobile Location Centre,
  AMF means Mobility Management Function;
  NLs is the interface between the LMF and the AMF,
  LTE-Uu is the interface between the UE and the ng-eNB in LTE,
  NR-Uu is the interface between the UE and the gNB in NR,
  Xn is the interface between the ng-eNB and gNB.
  TP means . . . , Transmission point
  Note 1: The gNB and ng-eNB may not always both be present.
  Note 2: When both the gNB and ng-eNB are present, the NG Core (NG-C) interface is only present for one of them.

There exist already numerous methods to enable the computation of a UE's position in a network, making use of reference signals either received by the UE, downlink reference signals, received by the network, uplink reference signals, or both. Typically, a positioning algorithm is deployed over multiple cells involved in measurements of reference signals. The UE need not be connected to all cells, in the sense that not all cells are serving cells with an RRC connection.

Among the existing solutions, time-based positioning solutions have attracted interest. The following methods have been discussed within the 3GPP standardization Downlink Positioning:
  Timing based techniques such as:
  Timing of arrival path(s), and.
  Phase difference based techniques.
    Note: feasibility needs to be further assessed.
  Angle-based techniques such as:
  Downlink angle(s) of departure, and
  Downlink angle(s) of arrival.
  Carrier-phase based techniques.
  Note: feasibility needs to be further assessed.
  Received reference signal power based techniques.
  Cell ID and TRP related information, e.g. RS resource and/or resource set ID.
UL Positioning:
  Timing based techniques such as:
  Timing of arrival path(s)
  Angle-based techniques such as:
  Uplink angle(s) of departure, and
  Uplink angle(s) of arrival.
  Carrier-phase based techniques.
  Note: feasibility needs to be further assessed Received reference signal power based techniques.
Downlink+Uplink:
Timing based techniques such as:
Round trip time measurement including support for multiple TRPs.
Combination of DL and UL techniques for NR positioning such as:
e.g. E-CID like techniques (including one or multiple cells)
Combination of DL, UL and DL+UL techniques can be used for NR positioning.
Combination of RAT-dependent and RAT-independent techniques can be considered for NR positioning.

A problem in the current methods for positioning is that they are cumbersome and the power consumption is high.

SUMMARY

An object of embodiments herein is to provide a method for positioning a radio device that is simple and that requires less power consumption.

According to an aspect, the object is achieved by a method performed by a method receiving radio node for positioning a radio device.

The receiving radio node receives the first signal from the transmitting radio node, and measures a time of arrival of the first signal. The first signal is also received by a radio device. The receiving radio node further receives a second signal from the radio device. The second signal is the first signal that has been scattered and frequency modulated by the radio device when the first signal was received by the radio device from the transmitting radio node.

The receiving radio node measures a time of arrival of the second signal. The receiving radio node then calculates a Time Difference Of Arrival, TDOA, based on the measured time of arrival of the first signal and the measured time of arrival of the second signal. The calculated TDOA enables resolving the position of the radio device.

According to another aspect, the object is achieved by a method performed by a radio device for enabling positioning of the radio device.

The radio device receives the first signal from the transmitting radio node. The first signal is also received by a receiving radio node. The radio device scatters the first signal and frequency modulates the scattered first signal resulting in a second signal.

The radio device sends the scattered and frequency modulated second signal to the respective one or more receiving radio nodes. The sent scattered and frequency modulated second signal enables each respective receiving radio node to calculate a respective Time Difference Of Arrival (TDOA) for positioning the radio device based on: A time of arrival measured on the first signal received in the receiving radio node from the transmitting radio node, and a time of arrival measured on the scattered and frequency modulated second signal.

According to another aspect, the object is achieved by a method performed by a network node for positioning a radio device.

The network node receives from each of the one or more receiving radio nodes, a calculated Time Difference Of Arrival (TDOA).

The calculated TDOA is based on a measured time of arrival of the first signal being received by the receiving radio node from the transmitting radio node, and a measured time of arrival of a second signal. The second signal is the first signal that has been scattered and frequency modulated by the radio device when the first signal was received by the radio device from the transmitting radio node.

The network node then computes the position of the radio device based on the received one or more measured TDOAs.

According to another aspect, the object is achieved by a receiving radio node configured to position a radio device. The receiving radio node is further configured to:
Receive a first signal from the transmitting radio node, which first signal is also adapted to be received by a radio device.
measure a time of arrival of the first signal,
receive a second signal from the radio device, wherein the second signal is adapted to be the first signal that has been scattered and frequency modulated by the radio device when the first signal was received by the radio device from the transmitting radio node,
measure a time of arrival of the second signal, and
calculate a Time Difference Of Arrival (TDOA) based on the measured time of arrival of the first signal and the measured time of arrival of the second signal. The calculated TDOA is adapted to enable resolve the position of the radio device.

According to another aspect, the object is achieved by a radio device configured to enable positioning of the radio device. The radio device is further configured to:
Receive the first signal from the transmitting radio node, which first signal is also adapted to be received in a receiving radio node.
scatter the first signal and frequency modulate the scattered first signal resulting in a second signal,
send the scattered and frequency modulated second signal to the respective one or more receiving radio nodes. The sent scattered and frequency modulated second signal is adapted to enable each respective receiving radio node to calculate a respective Time Difference Of Arrival (TDOA) for positioning the radio device based on a time of arrival measured on the first signal received in the receiving radio node from the transmitting radio node, and a time of arrival measured on the scattered and frequency modulated second signal.

According to another aspect, the object is achieved by a network node configured to position a radio device. The network node is further configured to:
Receive from each of the one or more receiving radio nodes, a calculated Time Difference Of Arrival (TDOA). The calculated TDOA is adapted to be based on a measured time of arrival of the first signal is adapted to be received by the receiving radio node from the transmitting radio node, and a measured time of arrival of a second signal. The second signal is adapted to be the first signal that has been scattered and frequency modulated by the radio device when the first signal was received by the radio device from the transmitting radio node.
Compute the position of the radio device based on the received one or more measured TDOAs.

BRIEF DESCRIPTION OF THE DRAWINGS

FIG. 6 is a flow chart depicting embodiments of a method in a network node.

FIG. 9 is a schematic diagram depicting an example embodiment herein.

FIGS. 16 to 19 are flowcharts illustrating methods implemented in a communication system including a host computer, a base station and a user equipment.

DETAILED DESCRIPTION

Examples of embodiments herein provide a method of in intentionally modulating a scattered signal using a scattering radio for locating a radio device, also referred to as a scatterer herein.

To scatter a signal when used herein may e.g. means that the signal reflected by surrounding objects.

A scattering radio when used herein may e.g. means a radio which intentionally reflects the signal which is received on its antenna.

A scatterer when used herein may e.g. means an object comprising a scattering radio.

The provided method is a low power consuming method for locating radio equipped objects such as radio devices, e.g. a UE. The methods may e.g. be used in asset tracking requiring very low power solutions. Embodiments herein may only need a very low power radio device comprising an antenna and a switch, which enables the positioning. This method may also be used as for UE independent positioning. This means that the UE need not transmit any signal for positioning purposes nor does it need to communicate any information for positioning purposes.

An example of embodiments herein relates to positioning with a Doppler modulating scatterer.

Advantage of embodiments herein e.g. comprises the following: The provided methods may be implemented by using a very simple device.

Embodiments herein provide very spectrum and energy efficient methods of positioning.

Embodiments herein may work very well in certain scenarios. Such example is to locate static objects equipped with a radio device according to embodiments herein. Examples of locating static objects e.g. comprise locating containers in shipyard, locating objects in factories etc.

Embodiments herein may be network centric. This means that the network does the positioning calculation.

Some embodiments herein provide identifying the radio device with its Doppler signature while positioning it. This solves the problem of identifying objects in such scatterer based positioning.

Figure 2:
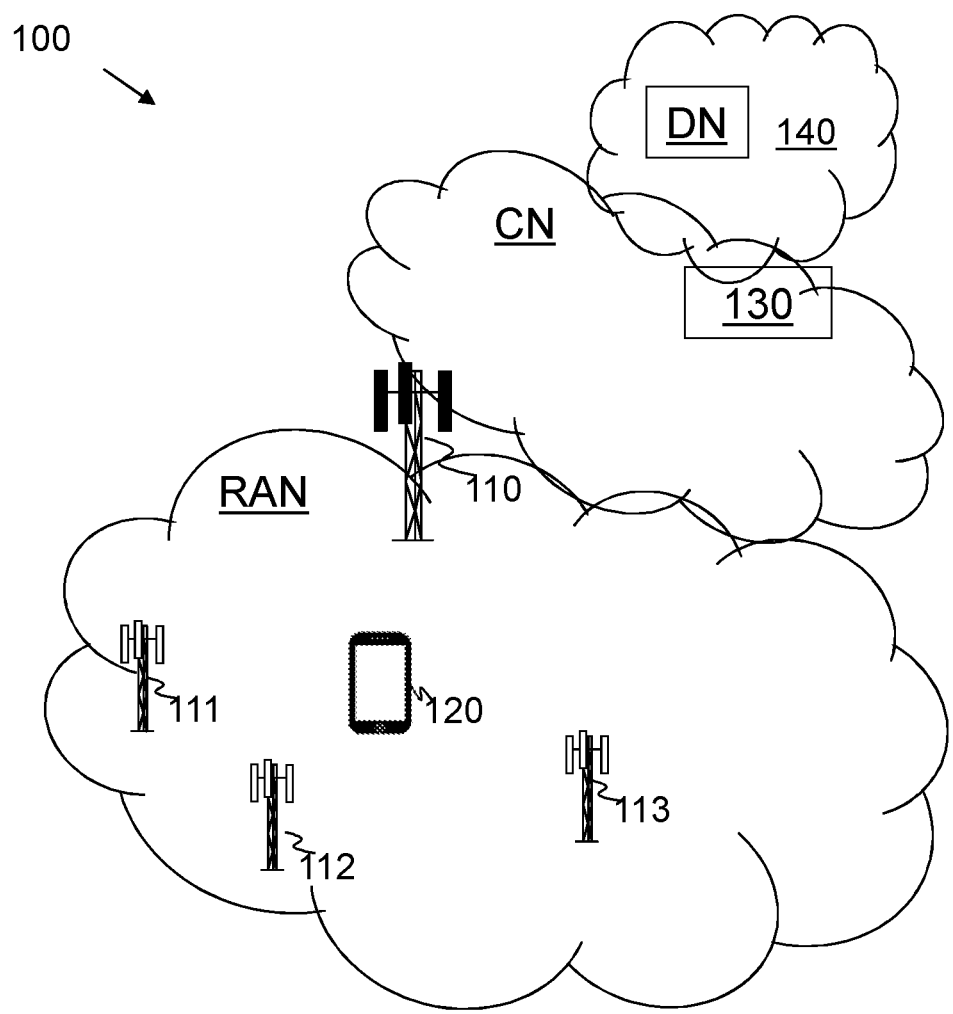
FIG. 2 is a schematic block diagram depicting embodiments of a wireless communication network.

FIG. 2 is a schematic overview depicting a wireless communications network 100 wherein embodiments herein may be implemented. The wireless communications network 100 comprises one or more RANs and one or more CNs. The wireless communications network 100 may use 5 Fifth Generation New Radio, (5G NR) but may further use a number of other different Radio Access Technologies (RAT)s, such as, WI-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Radio nodes such as a transmitting radio network node 110, and one or more receiving radio nodes 111, 112, 113 operate in the wireless communications network 100. The transmitting and receiving radio nodes 110, 111, 112, 113 may each provides radio access in one or more cells. This may mean that the transmitting and receiving radio nodes 110, 111, 112, 113 provide radio coverage over a geographical area by means of its antenna beams. The transmitting and receiving radio nodes 110, 111, 112, 113 may each be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a radio device within the cell served by network node 110 depending e.g. on the radio access technology and terminology used.

In one particular embodiment the receiving radio nodes 111, 112, 113, may be UEs with known location or UEs with certain error distribution on their estimated position.

Radio devices such as the radio device 120 operate in the wireless communications network 100. The radio device 120 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the TRP 110, one or more RANs to one or more CNs. It should be understood by the skilled in the art that the UE 120 relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Figure 3:
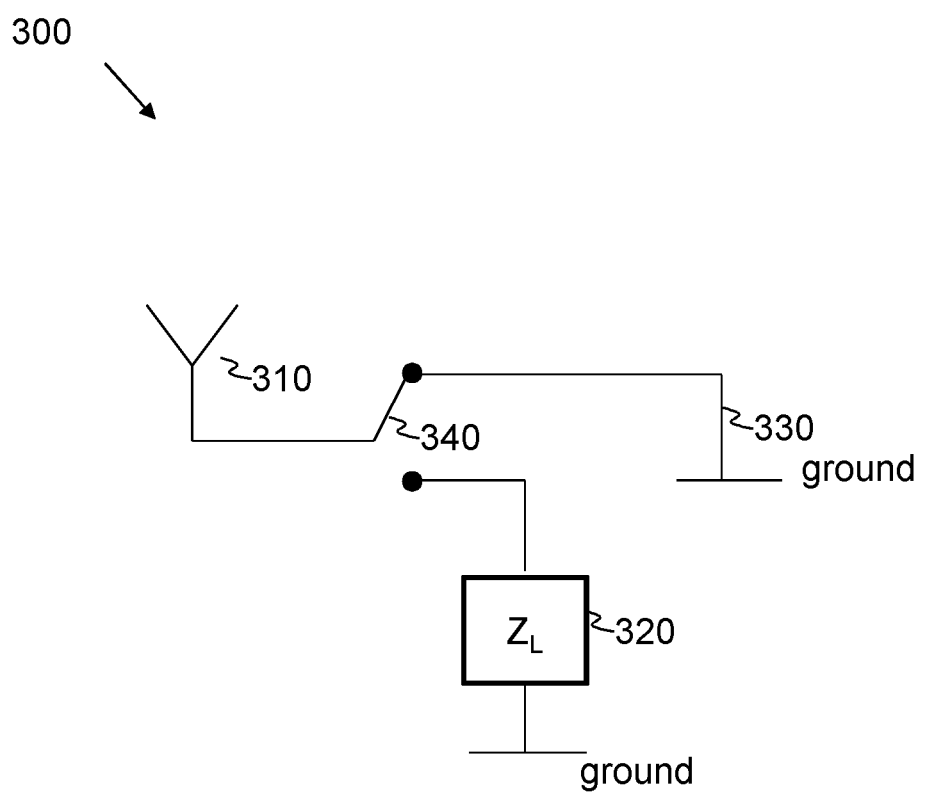
FIG. 3 is a schematic block diagram depicting an embodiment herein.

The radio device 120 is in its simplest performance a very low power radio device comprising an antenna and a switch, which enables the positioning. This is shown in FIG. 3.

The radio device 120 may comprise radio equipment 300, adapted to scatter the first signal and frequency modulate the scattered first signal, e.g. frequency modulate the scattered signal by introducing a deliberate Doppler. To introduce a deliberate Doppler means to frequency modulating the reflected signal.

The radio equipment 300 may comprise a receiver unit comprising an antenna 310 tuned to the first signal by the transmitting radio node 110, which antenna 310 is terminated either in a matched load Z L 320, a short circuit, or an open termination 330, through a switch 340 such that:

When the switch 340 connects the matched load to the antenna, the received first signal is absorbed in the matched load Z L 320, and when the switch 340 is terminated in the short or open 330, the received first signal is reflected entirely resulting in the scattered signal outside of the antenna.

$Z_L$ may be open circuit or a matched impedance.

The radio equipment 300 may further comprise a transmitter unit adapted to frequency modulate the scattered signal with Doppler frequency resulting in the second signal.

An object that requires to be kept track of may be equipped with the radio device 120 enabling to position the radio device 120 and thus also the object. The radio device 120 may e.g. an asset or low power device equipped with the antenna 310 and the switch 340 e.g. to be used in asset tracking requiring a very low power solution.

The radio device 120 is thus capable of scattering and frequency modulate an incoming first signal resulting in a second signal. This will be described more below.

Referring again to FIG. 2, Other network nodes such as a network node 130 operate in the wireless communications network 100. The network node 130 may provide positioning service and may e.g. be an LMF node.

Figure 1:
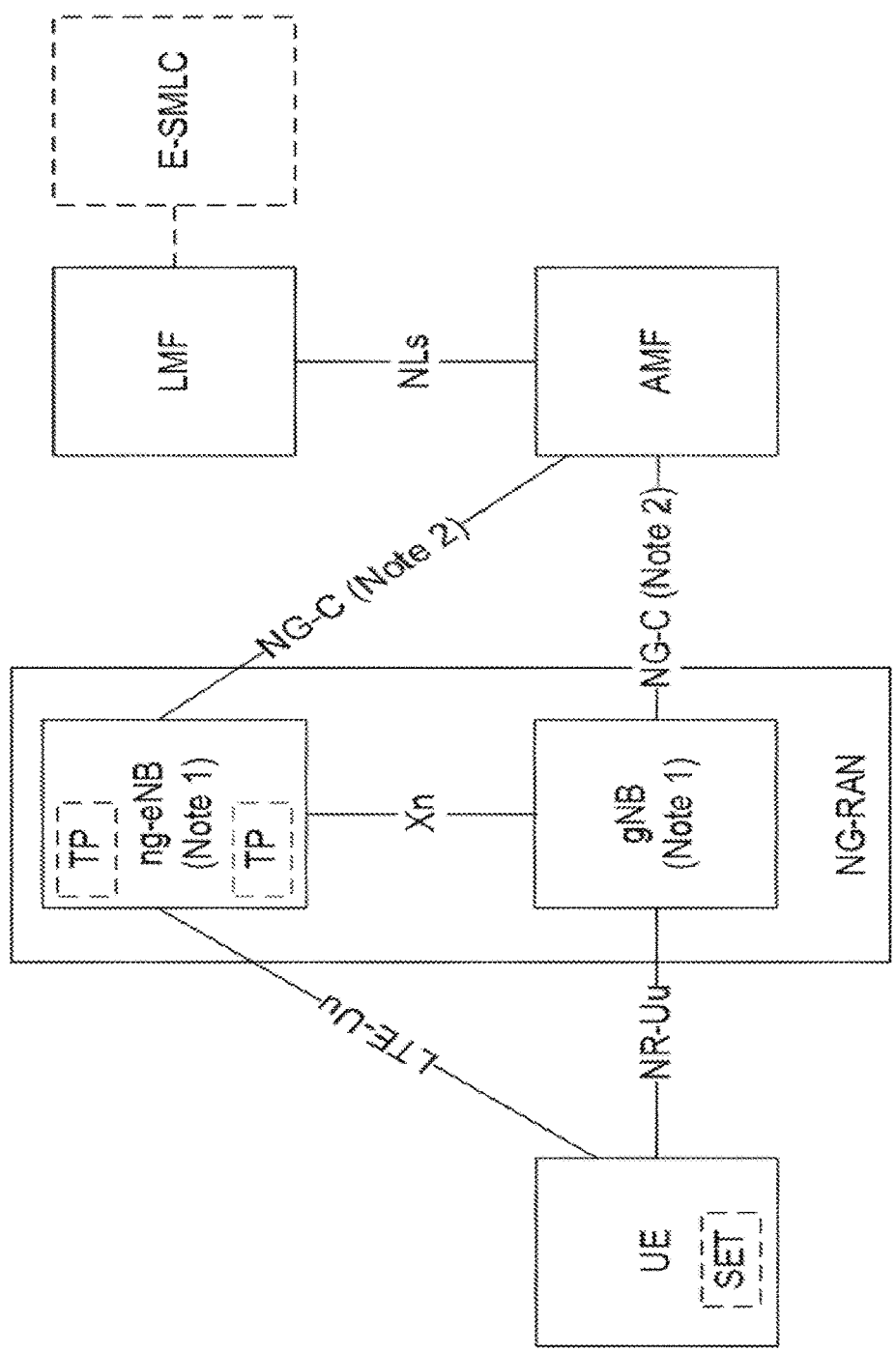
FIG. 1 is schematic block diagrams depicting an architecture of prior art.

Methods herein may e.g. be performed by the network node 130. As an alternative, a Distributed Node (DN) and functionality, e.g. comprised in a cloud 140 as shown in FIG. 1a, may be used for performing or partly performing the methods.

Embodiments herein e.g. provide a method of localizing, also referred to as positioning, the radio device 120 by using a scattered and frequency modulated signal sent from the radio device 120 to be received by the one or more receiving radio receivers 111, 112, 113.

In short, according to an example scenario the transmitting radio node 110 sends a first signal to be received by the radio device 120 and the one or more receiving radio nodes 111, 112, 113.

The one or more receiving radio nodes 111, 112, 113 each measures time of arrival of the first signal received from the transmitting radio node 110, which is the measurement of the first signal.

The radio device 120 scatters and frequency modulates the first signal received signal from radio device 120, resulting in a second signal and sends it to be received by the one or more receiving radio nodes 111, 112, 113.

Each of the one or more receiving radio nodes 111, 112, 113 also measures time of arrival of the frequency modulated scattered second signal from the radio device 120, that is the measurement of the second signal.

Each of the one or more receiving radio nodes 111, 112, 113 calculates a respective TDOA from the measurements of the first signal and measurement of the second signal.

The one or more receiving radio nodes 111, 112, 113 may then compute the position of radio device 120 based on the calculated TDOA, or sends the calculated TDOA to another node e.g. the network node 130 or the transmitting radio node 110, for computing position of radio device 120.

The method will first be described in as seen from the receiving radio node 111 perspective together with FIG. 4, then as seen from the radio device 120 perspective together with FIG. 5 which will be followed by the method as seen from the network node 130 perspective together with FIG. 6.

Figure 4:
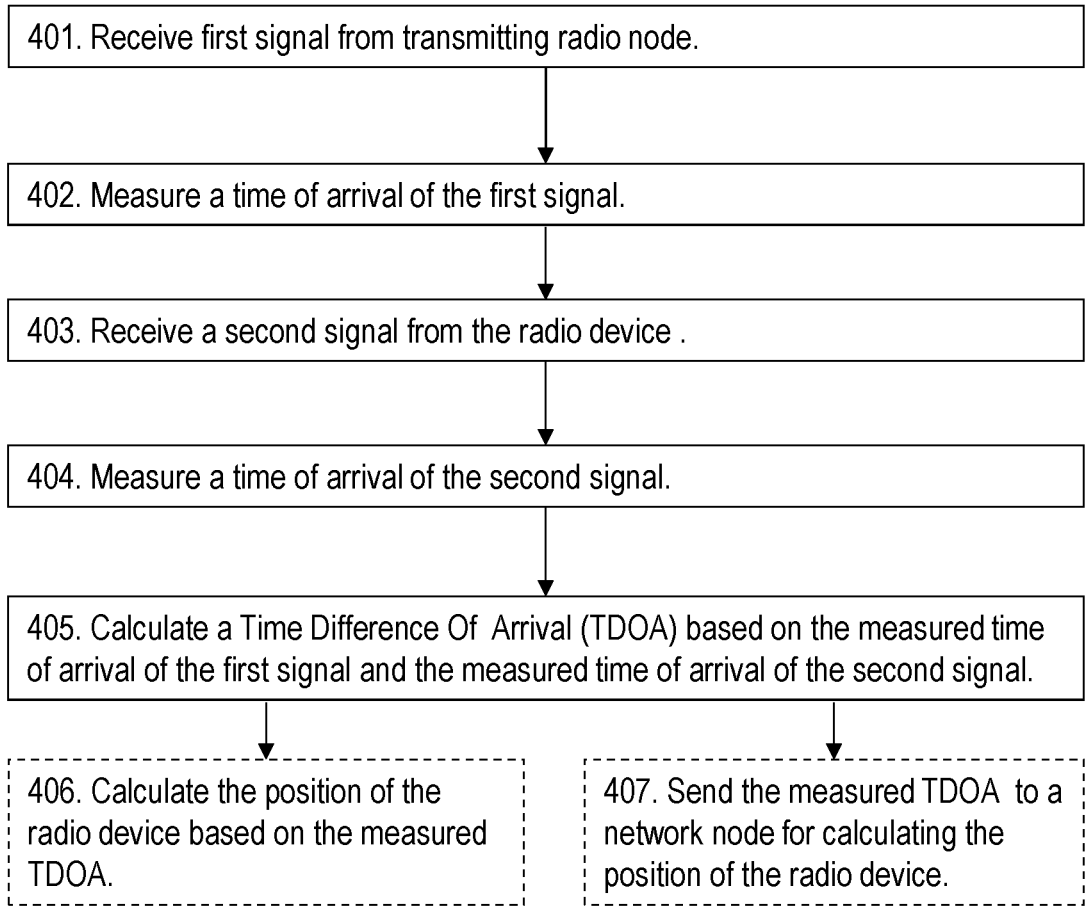
FIG. 4 is a flow chart depicting embodiments of a method in a receiving radio node.
Figure 5:
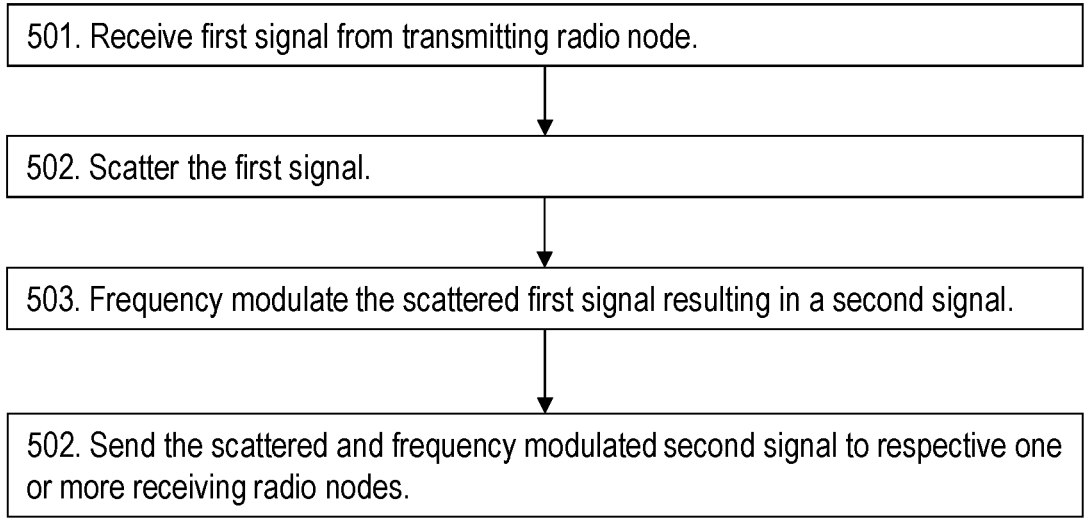
FIG. 5 is a flow chart depicting embodiments of a method in a radio device.

FIG. 4 shows example embodiments of a method performed by a receiving radio node 111 for positioning a radio device 120. In a scenario according to embodiments herein, the transmitting radio node 110 is transmitting a first signal to be received by the radio device 120 and the receiving radio node 111.

The method comprises one or more of the following actions, which actions may be taken in any suitable order. Actions that are optional are marked with dashed boxes in the figure.

According to an example scenario, the radio device 120 needs to be positioned. Therefore the transmitting radio node 110 starts to or is informed, asked or commanded to start to transmit a first signal.

Action 401

The one or more receiving radio nodes 111, 112, 113, in this example, the receiving radio node 111, e.g. listens for, or may be informed, asked or commanded to receive the a first signal. Thus the receiving radio node 111 receives the first signal from the transmitting radio node 110.

Action 402

The receiving radio node 111 then measures a time of arrival of the first signal.

Action 403

The radio device 120 has also received the first signal transmitted by the transmitting radio node 110. In order to position the radio device 120 according to embodiments herein, the radio device 120 will scatter and frequency modulate the signal and send it to be received by the or more receiving radio nodes 111, 112, 113, in this example, the receiving radio node 111 for time of arrival measurement.

Consequently, the receiving radio node 111 receives a second signal from the radio device 120. The second signal is the first signal that has been scattered and frequency modulated by the radio device 120 when the first signal was received by the radio device 120 from the transmitting radio node 110.

The advantageous effect of by scattering the signal is that the scattering is a passive process. The scattering node, such as the radio device 120, is not generating any new signal. It just scatters the signal which impinges on its antenna.

The advantageous effect by frequency modulate the scattered signal is that every scattering node such as the radio device 120 may be identified by its modulating frequency. Every scattering node, such as the radio device 120, may have a unique modulating frequency with which it is modulating the signal impinging on it.

In some embodiments the scattered first signal has been frequency modulated to embed an identity of the radio device 120. This enables to resolve the identity of the radio device 120 when positioned. So in some embodiments the radio device is both positioned and is identified. This helps the position requester to see if correct radio device is positioned, e.g. found, among other radio devices.

In some embodiments, the radio device 120 may be configured with a modulating frequency that is different compared to other radio devices enabling to distinguish the radio device 120 from the other radio devices.

The frequency modulated scattered first signal may be represented by: a Doppler modulated scattered first signal. An advantage of Doppler modulating the scattered signal is in identifying scatterers, such as the radio device 120, with their modulating frequencies.

Action 404

The receiving radio node 111 measures a time of arrival of the second signal.

To enable positioning to the radio device 120 the receiving radio node 111 measures time of arrival of this second signal. The time of arrival of the second signal will then be compared to the time of arrival of the first signal in a TDOA calculation in the action below.

Action 405

The receiving radio node 111 calculates a TDOA, based on the measured time of arrival of the first signal and the measured time of arrival of the second signal. The calculated TDOA enables resolving the position of the radio device 120. How this is calculated will be explained below.

The calculating of the TDOA may result in an ellipse indicating the position of the radio device 120. Also this will be explained more in detail below.

Action 406

The receiving radio node 111 may in some embodiments resolve the position of the radio device 120, itself, by calculating the position of the radio device 120 based on the measured TDOA.

Action 407

The receiving radio node 111 may also send the measured TDOA to a network node 130 for calculating the position of the radio device 120, e.g. to the network node 130.

The calculating to the position of the radio device 120 will be explained more in detail below.

The method will now be described as seen from the radio device 120 perspective. FIG. 5 shows example embodiments of a method performed by the radio device 120 for enabling positioning of the radio device 120. In a scenario according to embodiments herein, the transmitting radio node 110 is transmitting a first signal to be received by the radio device 120 and the one or more receiving radio nodes 111, 112, 113.

The method comprises one or more of the following actions, which actions may be taken in any suitable order. Actions that are optional are marked with dashed boxes in the figure.

According to the example scenario described above, the radio device 120 needs to be positioned. Therefore the transmitting radio node 110 starts to or is informed, asked or commanded to start to transmit a first signal.

Action 501

The radio device 120 receives the first signal from the transmitting radio node 110.

Action 502

As mentioned above, in order to position the radio device 120 according to embodiments herein, the radio device 120 will scatter and frequency modulate the signal and send it to be received by the or more receiving radio nodes 111, 112, 113, in this example, the receiving radio node 111 for time of arrival measurement.

Accordingly, the radio device 120 scatters the first signal. How this is performed will be described more in detail below.

Action 503

The radio device 120 frequency modulates the scattered first signal resulting in a second signal. How this is performed will be described more in detail below.

As mentioned above, the frequency modulating of the scattered first signal may be performed to embed the identity of the radio device 120 enabling to resolve the identity of the radio device 120 when positioned. The frequency modulating of the scattered first signal may comprise to Doppler modulate the scattered first signal.

As mentioned above, the radio device 120 may be configured with a different modulating frequency compared to other radio devices enabling to distinguish the radio device 120 from the other radio devices.

Action 504

The radio device 120 sends the scattered and frequency modulated second signal to the respective one or more receiving radio nodes 111, 112, 113.

As mentioned above, the sent scattered and frequency modulated second signal enables each respective receiving radio node 111, 112, 113 to calculate a respective TDOA for positioning the radio device 120 based on:

A time of arrival measured on the first signal received in the receiving radio node 111, 112, 113 from the transmitting radio node 110, and a time of arrival measured on the scattered and frequency modulated second signal.

The method will now be described as seen from the network node 130 perspective. FIG. 6 shows example embodiments of method performed by the network node 130 for positioning a radio device 120.

In a scenario according to embodiments herein, the transmitting radio node 110 is transmitting a first signal to be received by the radio device 120 and the one or more receiving radio nodes 111, 112, 113.

The method comprises one or more of the following actions, which actions may be taken in any suitable order. Actions that are optional are marked with dashed boxes in the figure.

According to the example scenario described above, the radio device 120 needs to be positioned. E.g. the network node 130 needs to position the radio device 120. Therefore the transmitting radio node 110 starts to or is informed, asked or commanded e.g. by the network node 130, to start to transmit a first signal.

Action 601

The network node 130 receives from each of the one or more receiving radio nodes 111, 112, 113, a calculated TDOA. As mentioned above, the calculated TDOA is based on:

a measured time of arrival of the first signal being received by the receiving radio node 111, 112, 113 from the transmitting radio node 110, and a measured time of arrival of a second signal, wherein the second signal is the first signal that has been scattered and frequency modulated by the radio device 120 when the first signal was received by the radio device 120 from the transmitting radio node 110.

The frequency modulated scattered first signal may be represented by a Doppler modulated scattered first signal.

The radio device 120 may configured with a modulating frequency, e.g. a specific modulating frequency, that is different compared to other radio devices enabling to distinguish the radio device 120 from the other radio devices. In these embodiments, the scattered first signal is frequency modulated with the specific modulating frequency that is different.

Action 602

The network node 130 then calculates the position of the radio device 120 based on the received one or more measured TDOAs. This will be described more in detail below.

In some embodiments, the scattered first signal has been frequency modulated to embed an identity of the radio device 120 enabling, e.g. the network node 130, to resolve the identity of the radio device 120 when positioned.

In some embodiments, each calculated TDOA results in an ellipse, wherein the one or more ellipses intersect at the position of the radio device 120.

The embodiments described above will now be further explained and exemplified. The example embodiments described below may be combined with any suitable embodiment above.

Figure 7:
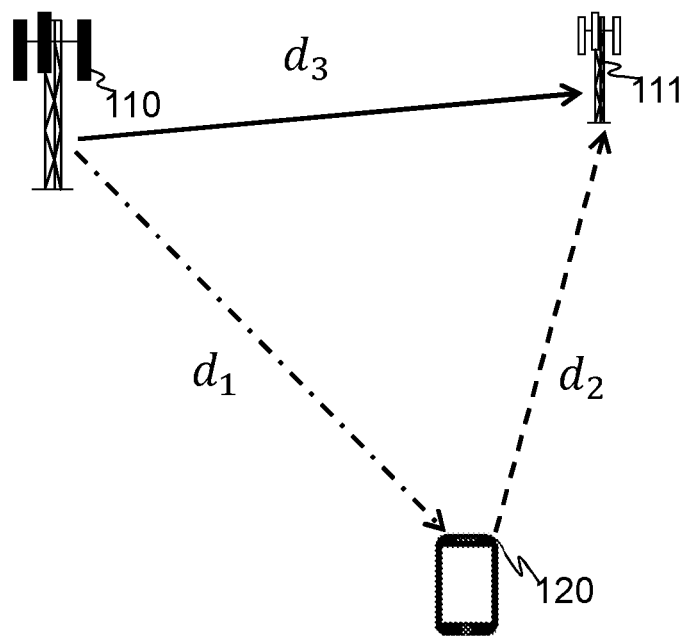
FIG. 7 is a schematic diagram depicting an example embodiment herein.

In FIG. 7 illustrating an example scenario of embodiments herein, three nodes are depicted, the transmitting radio node 110, the radio device 120 and the receiving radio node 111. The radio device 120 may be referred to as the scatterer node. The distances between the transmitting radio node 110 and the radio device 120 are referred to as $d_1$. The distances between the radio device 120 and the receiving radio node 111 is referred to as $d_2$ and the distances between the transmitting radio node 110, and the receiving radio node 111 is referred to as $d_3$. The locations of the transmitting radio node 110 and the receiving radio node 111 are known. The location of the radio device 120 is unknown and needs to be estimated. Hence the distance $d_3$ is known. Whereas, the distances $d_1$, and $d_2$ are unknown.

In the scenario shown in the figure, the transmitting radio node 110 transmits a signal, the signal gets scattered by the radio device 120. The receiving radio node 111 receives signals from the node transmitting radio node 110 and the scattered signal from the radio device 120. Power levels P received at the three nodes comprise.

$$P_{120} = P_{110} * G_{110} * G_{120} \left(\frac{\lambda}{4\pi d_1}\right)^2.$$

$$P_{111}^{120} = P_{120} * G_{120} * G_{110} \left(\frac{\lambda}{4\pi d_2}\right)^2$$

$$P_{111}^{110} = P_{120} * G_{120} * G_{110} \left(\frac{\lambda}{4\pi d_3}\right)^2$$

$$G_{110} = G_{120} = G_{111} = 2.1 \text{ dB } i.$$

Wherein G is an assumed gain of isotropic antennas.

The signals received at the receiving radio node 111 from the transmitting radio node 110 and the radio device 120 will have different power levels and time of arrivals. The power levels and time of arrivals will be dependent on the distances in the considered example scenario of FIG. 7. The longer the distances are, the longer the time of travel for the signal will be and hence the larger the time of arrival would be.

Figure 8:
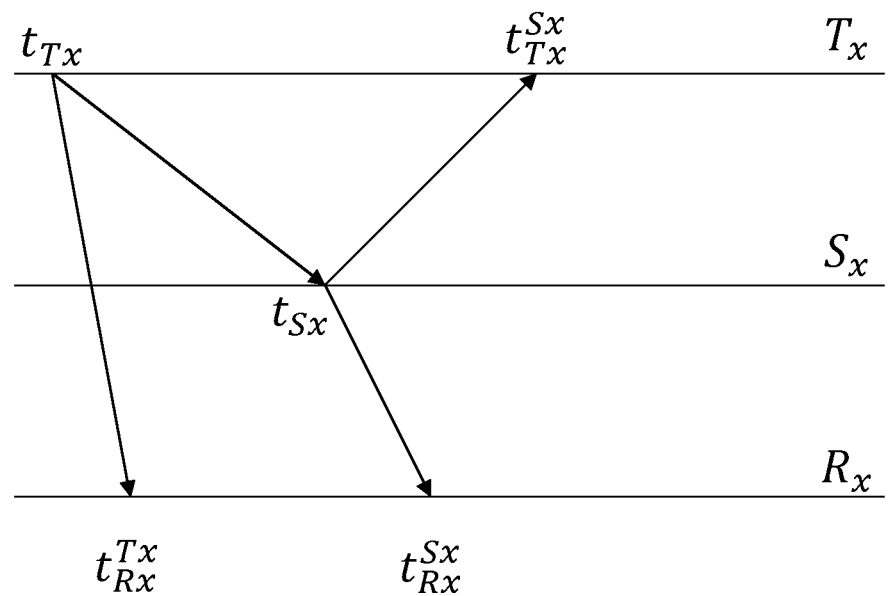
FIG. 8 is a schematic diagram depicting an example embodiment herein.

FIG. 8 depicts a timing diagram of the signal transmission and reception in the example scenario wherein the three x axis represents time. In this figure, the transmitting radio node 110 is referred to as Tx, the Receiving radio node 111 is represented by Rx and the radio device is represented by Sx.

As shown FIG. 8, the time difference measurement, i.e. the TDOA measurement, $Y_{Rx}$, at node Rx may be written as $$Y_{Rx} = t_{Rx}^{Sx} - t_{Rx}^{Tx} = \frac{1}{c}(d_1 + d_2 - d_3) \quad (1)$$

Where C is the speed of light. Let $(x_t, y_t)$ be the coordinates of the transmitting radio node 110, $(x_s, y_s)$ be the coordinate of the scatterer node, i.e. the radio device 120, and $(x_r, y_r)$ be the coordinate of the receiving node 111.

Since the distance $d_3$ is known, it may be subsumed as a constant. The measurement (1) may be written in terms of unknowns $(x_s, y_s)$ as, $$Y_{Rx} = 1/c(\sqrt{(x_t-x_s)^2+(y_t-y_s)^2}+\sqrt{(x_r-x_s)^2+(y_r-y_s)^2}-d_3) \quad (2)$$

This an equation of ellipse, where the foci of ellipse lies on the Tx and Rx node locations, i.e. the transmitting radio node 110 and the receiving radio node 111 locations. The trajectory of the ellipses is the possible location of the scatterer node Sx, i.e. the radio device 120. This is depicted in FIG. 9 and explained below.

Referring again to FIG. 3 illustrating is the receiver unit 310 which frequency modulates the scattered signal. This is the receiver unit of the radio device 120 in FIG. 7. As mentioned above, the radio equipment 300 may comprise the transmitter unit 340 and the receiver unit 310. The receiver unit 310 may comprise the antenna 320 tuned to the first signal by the transmitting radio node 110, which antenna 320 is terminated either in a matched load, a short circuit, or an open termination, through the switch 330 such that:

When the switch connects the matched load to the antenna, the received first signal is absorbed in the matched load, and when the switch is terminated in the short or open, the received first signal is reflected entirely resulting in the scattered signal out of the antenna.

The switch 330 may be turned on-off at a certain frequency, a so called switching frequency ($f_d$), which is akin to the Doppler frequency in a received signal. The scattered first signal is frequency modulated with Doppler frequency.

The first signal in this example is an Orthogonal Frequency Division Multiplexing (OFDM) signal, transmitted by the transmitting radio node 110 may be written as, $$x(t) = \text{Re}\left\{\frac{1}{\sqrt{N}}\sum_{k=0}^{N-1} X_k e^{2j\pi(k\Delta f+f_c)t}\right\},$$

where, $\Delta f$ is the subcarrier frequency spacing, k is the subcarrier, and, $f_c$ is the carrier frequency, N is the number of subcarriers, and Re is the real operator.

The Doppler modulated first signal resulting in the second signal may be written as, $$m(T) = \text{Re}\left\{\frac{1}{\sqrt{N}}\sum_{k=0}^{N-1} X_k e^{2j\pi(k\Delta f+f_c+f_d)t}\right\}.$$

where, $f_d$, is the Doppler frequency. The transmitted second signal at the radio device 120 may be, $$x(t) = \sum_{l=0}^{L} h_l * \text{Re}\left\{\frac{1}{\sqrt{N}}\sum_{k=0}^{N-1} X_k e^{2j\pi(k\Delta f+f_c+f_d)(t-d_s/c-\tau_l)}\right\}$$

where, $h_l$ is the strength of the lth path, and, $\tau_l$ is additional delay relative to the direct path $\tau_0=0$.

The received signal from the scatterer, i.e. the radio node 120, at the receiving node 111 may be given as, $$r(t) = \sum_{m=0}^{M} q_m * x(t) e^{2j\pi(t-d_r/c-\tau_m)}$$

where $q_m$ is the strength of the signal path indexed by m received at the receiver. $d_r$ is the distance of the receiving node 111 from the radio node 120. As mentioned above, $f_d$ is the Doppler frequency introduced by the radio node 120. It should be noted that all paths received at the receiving node 111, which are scattered by the radio node 120, are Doppler frequency modulated.

FIG. 9. depicts an example scenario wherein ellipses resulting from measurements at the receiving radio nodes 111, 112, 113 would intersect at location of the radio node 120, also referred to as the scatterer node. Tx is represented by the transmitting node 110. Sx is represented by the scattering radio device 120 and Rx1, Rx2, Rx3 are represented by the multiple receiving radio nodes 111, 112, 113 receiving the scattered signals i.e. the second signals, and direct signals, i.e. the first signals from the transmitting radio node 110.

The FIG. 9 shows an example scenario of how the positioning method may work based on the reception of scattered second signal.

Different receivers such as the multiple receiving radio nodes 111, 112, 113 with known locations are placed to receive the scattered second signal from a scatterer such as the radio device 120 at an unknown location. The scatterer is the object to be located.

The multiple receiving radio nodes 111, 112, 113 also receive signals directly from the transmitting radio node 110. These receiving radio nodes 111, 112, 113 estimate, also referred to as measure, time of arrival from the first signal received from the transmitting node 110 and the scattered second signal received from the radio node 120. These measurements may be described by equation (1) described above.

Every transmitter and receiver pair forms an ellipse with the location of the scatterer on the trajectory of the ellipse. The transmitter and receiver pair may e.g. be: Receiving radio node 111 and transmitting radio node 110, receiving radio node 112 and transmitting radio node 110, and receiving radio node 113 and transmitting radio node 110.

Intersections of all these ellipses find the location of the radio device 120 such as the scatterer, uniquely.

Figure 10:
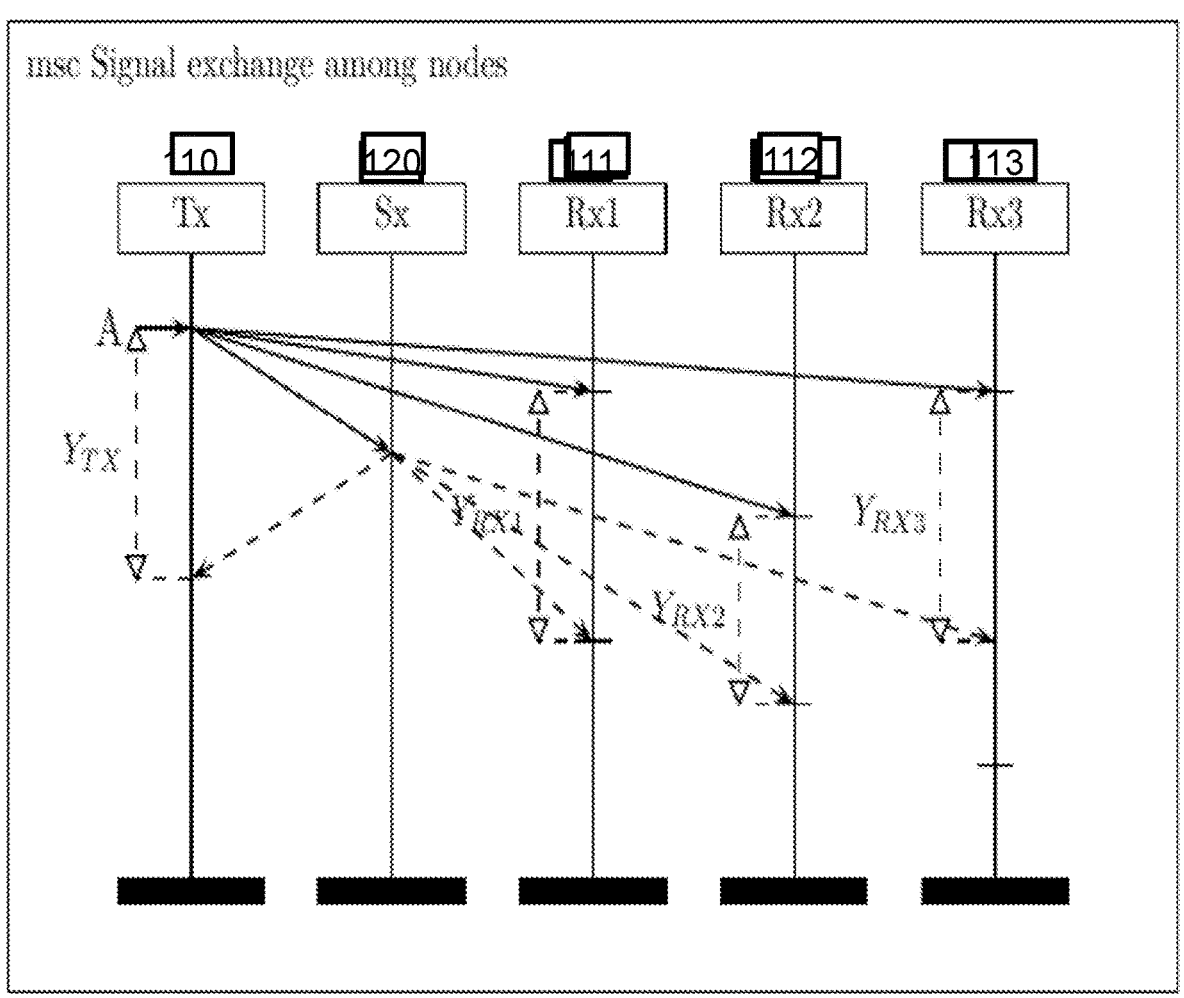
FIG. 10 is a schematic signalling diagram depicting an example embodiment herein.

FIG. 10 depicts an example of a message signalling chart showing the signal exchanges among various nodes such as the radio node 120, referred to as Sx, the receiving radio nodes 111, 112, 113, referred to as Rx1, RX2, Rx3, and the transmitting radio node 110 referred to as Tx. The dotted lines show the reflected signal. The point A in FIG. 10 corresponds to the transmission time from the node Tx.

The timing signalling chart shows the sequence of transmitting and receiving events among the Tx, Sx and Rx nodes.

SOME EXAMPLE EMBODIMENTS

Some embodiments are on modulating the scattered signal to embed the identity of the radio node 120. In these embodiments the modulating frequency may help in identifying the scatterer in presence of many scattering nodes.

Some embodiments refer to the scatterer hardware such as the radio equipment 300 as suggested in FIG. 3 and explained above. This is an advantageous hardware which without generating any signal modulates the incoming first signal and frequency modulates and scatters it resulting in a second signal.

Some embodiments are on using the frequency modulated scattered signal for locating the scatterer.

Some embodiments are on changing the Doppler frequency adaptively, such as e.g. the modulating frequency may be changed for certain purposes.

As mentioned above, different scatterers such as radio devices e.g. radio device 120, may be distinguished with different modulating Doppler frequencies, $f_{d1}$, $f_{d2}$, $f_{d3}$ . . . $f_{dN}$. The Scatterers may be programmed with different modulating frequencies.

A large number of receivers e.g. including receiving radio nodes 111, 112, 113, may be placed in order to improve the position estimation of the scattering nodes. However, in its simplest form, embodiments herein only comprise one receiving radio node 111.

As mentioned above, in one particular embodiment, the receiving radio nodes 111, 112, 113, may be UEs with known location or UEs with certain error distribution on their estimated position. Time of arrival measurements of the scattered second signal from the radio device 120 to the UEs may be gathered and position of the scatterer may be estimated.

Some embodiments are on angle of arrival estimation of the frequency modulated and scattered second signal. The receiving radio nodes 111, 112, 113 may estimate angle of arrival of the frequency modulated and scattered second signal from the radio device 120. The angle of arrival estimation may be combined with the time of arrival estimation and results in better positioning accuracy of the radio device 120.

Some embodiments may be on planning and deploying network nodes accordingly. E.g., for large aperture antennas number of base stations may be fewer and vice versa.

Some embodiments may be on specifying different IDs corresponding to different Doppler frequencies to the radio device 120. This means that different scattering devices, e.g. comprising the radio device 120, may have different modulating Doppler frequencies. The antenna switch may be digital controlled using the identity if the radio device 120.

Figure 11A:
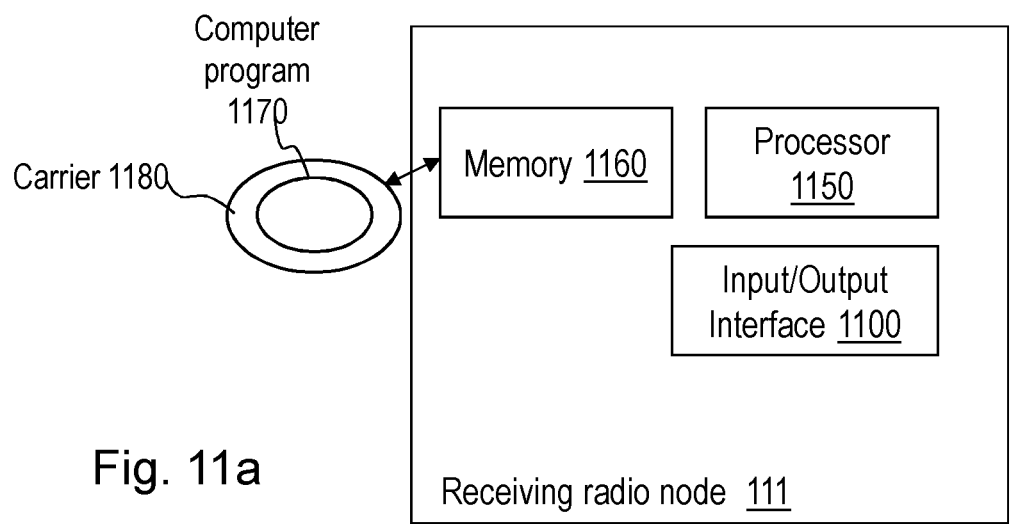
FIG. 11 a and b are schematic block diagrams depicting embodiments of a receiving radio node.
Figure 11B:
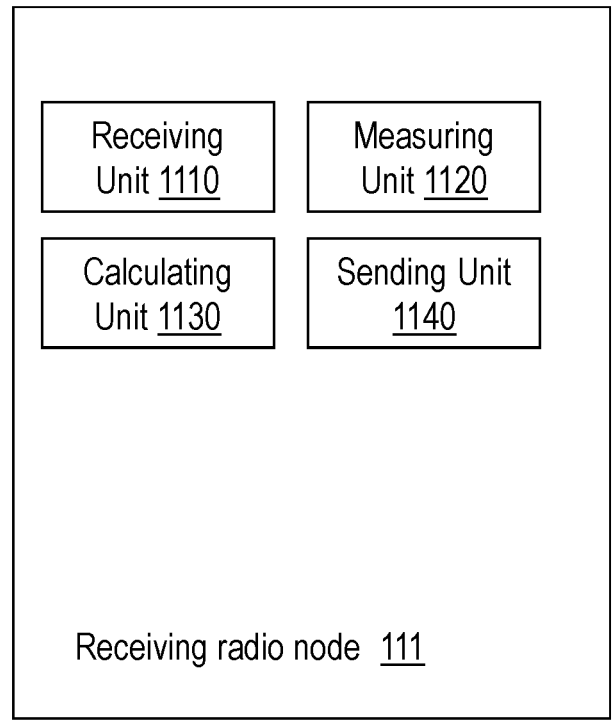

To perform the action as mentioned above, the receiving radio node 111 may comprise the arrangement as shown in FIG. 11 a and b. The receiving radio node 111 is configured to position the radio device 120. As mentioned above, the transmitting radio node 110 is adapted to transmit a first signal to be received by the radio device 120 and the receiving radio node 111.

The receiving radio node 111 may comprise a respective input and output interface 1100 configured to communicate with the radio device 120 and the transmitting radio node 110, see FIG. 11a. The input and output interface 1100 may comprise a wireless receiver (not shown) and a wireless transmitter (not shown).

The receiving radio node 111 is further configured to, e.g. by means of a receiving unit 1110 in the receiving radio node 111, receive the first signal from the transmitting radio node 110.

The receiving radio node 111 is further configured to, e.g. by means of the receiving unit 1110 in the receiving radio node 111, receive a second signal from the radio device 120. The second signal is adapted to be the first signal that has been scattered and frequency modulated by the radio device 120 when the first signal was received by the radio device 120 from the transmitting radio node 110.

In some embodiments, the scattered first signal is adapted to be frequency modulated to embed an identity of the radio device 120 enabling to resolve the identity of the radio device 120 when positioned.

In some embodiments, the frequency modulated scattered first signal is represented by: a Doppler modulated scattered first signal.

In some embodiments, the radio device 120 is configured with a modulating frequency that is different compared to it.

The receiving radio node 111 is further configured to, e.g. by means of a measuring unit 1120 in the receiving radio node 111, measure a time of arrival of the first signal.

The receiving radio node 111 is further configured to, e.g. by means of the measuring unit 1120 in the receiving radio node 111, measure a time of arrival of the second signal.

The receiving radio node 111 is further configured to, e.g. by means of a calculating unit 1130 in the receiving radio node 111, calculate a TDOA based on the measured time of arrival of the first signal and the measured time of arrival of the second signal. The calculated TDOA is adapted to enable resolve the position of the radio device 120.

The receiving radio node 111 may further be configured to, e.g. by means of the calculating unit 1130 in the receiving radio node 111, calculate the TDOA resulting in an ellipse indicating the position of the radio device 120.

In some embodiments, the receiving radio node is further being configured to resolve the position of the radio device 120 by performing any one out of:
- calculate the position of the radio device 120 based on the measured TDOA, e.g. by means of the calculating unit 1130 in the receiving radio node 111 or
- send the measured TDOA to a network node 130 for calculating the position of the radio device 120 e.g. by means of a sending unit 1140 in the receiving radio node 111.

Figure 12A:
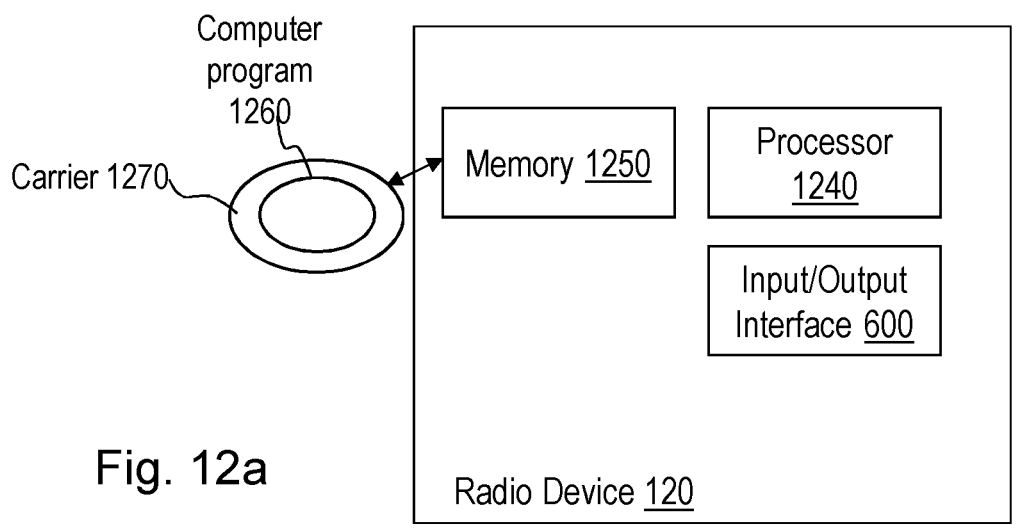
FIG. 12 a and b are schematic block diagrams depicting embodiments of a radio device.
Figure 12B:
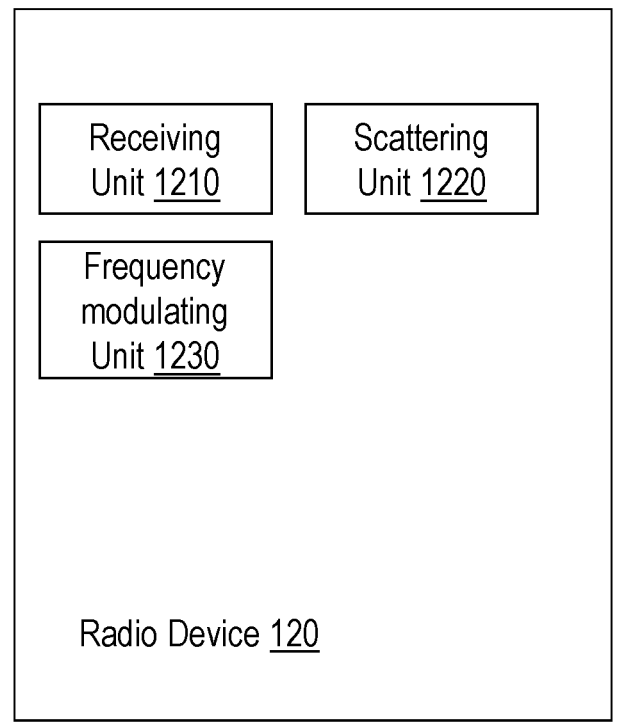

To perform the action as mentioned above, the radio device 120 may comprise the arrangement as shown in FIG. 12 a and b. The radio device 120 is configured to enable positioning of the radio device 120, wherein the transmitting radio node 110 is adapted to transmit a first signal to be received by the radio device 120 and one or more receiving radio nodes 111, 112, 113.

The radio device 120 may comprise a respective input and output interface 1200 configured to communicate with the transmitting radio node 110 and the one or more receiving radio nodes 111, 112, 113, see FIG. 12a. The input and output interface 1200 may comprise a wireless receiver not shown and a wireless transmitter not shown.

The radio device 120 is further configured to, e.g. by means of a receiving unit 1210 in the radio device 120, receive the first signal from the transmitting radio node 110.

The radio device 120 is further configured to, e.g. by means of a scattering unit 1220 in the radio device 120, scatter the first signal.

The radio device 120 is further configured to, e.g. by means of a frequency modulating unit 1230 in the radio device 120, the scattered first signal resulting in a second signal.

The radio device 120 may further be configured to frequency modulate the scattered first signal by embedding the identity of the radio device 120 enabling to resolve the identity of the radio device 120 when positioned.

In some embodiments, the radio device 120 is further configured to frequency modulate the scattered first signal by Doppler modulating the scattered first signal.

The radio device 120 is further configured to, e.g. by means of a sending unit 1230 in the radio device 120, send the scattered and frequency modulated second signal to the respective one or more receiving radio nodes 111, 112, 113. The sent scattered and frequency modulated second signal is adapted to enable each respective receiving radio node 111, 112, 113 to calculate a respective Time Difference Of Arrival, TDOA, for positioning the radio device 120 based on:
- A time of arrival measured on the first signal received in the receiving radio node 111, 112, 113 from the transmitting radio node 110, and
- a time of arrival measured on the scattered and frequency modulated second signal.

As mentioned above, he radio device 120 may comprise radio equipment 300 adapted to scatter the first signal and frequency modulate the scattered first signal. The radio equipment 300 may comprise:
- a receiver unit comprising an antenna 310 tuned to the first signal by the transmitting radio node 110. The antenna 310 may be terminated either in a matched load 320, a short circuit, or an open termination 330, through a switch 340 such that:
  - when the switch 340 connects the matched load 320 to the antenna, the received first signal is absorbed in the matched load 320, and
  - when the switch 340 is terminated in the short or open 330, the received first signal is reflected entirely resulting in the scattered signal out of the antenna 310.

The radio equipment 300 further comprises a transmitter unit 340 OK? adapted to frequency modulate the scattered signal with Doppler frequency resulting in the second signal.

The radio device 120 may further be configured with a modulating frequency that is different compared to other radio devices, enabling to distinguish the radio device 120 from the other radio devices.

Figure 13A:
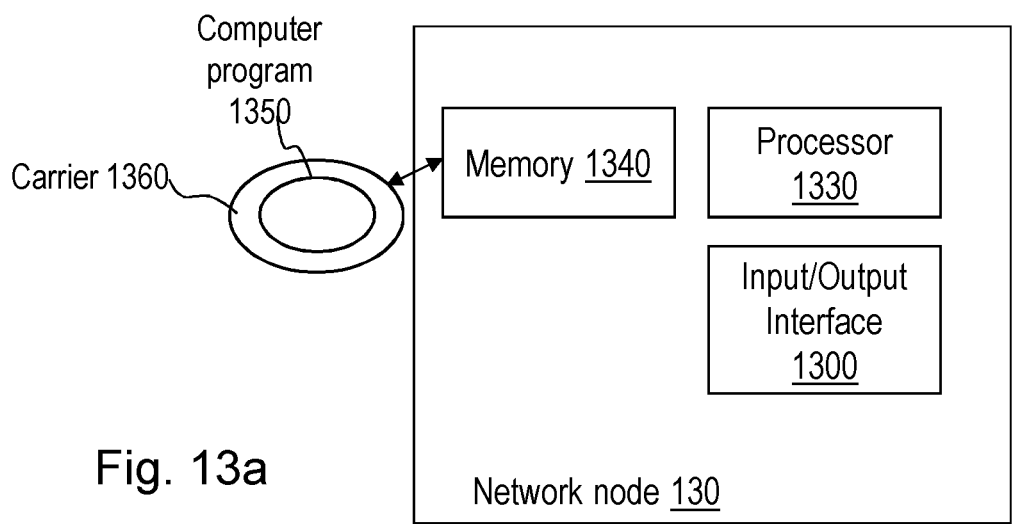
FIG. 13 a and b are schematic block diagrams depicting embodiments of a network node.
Figure 13B:
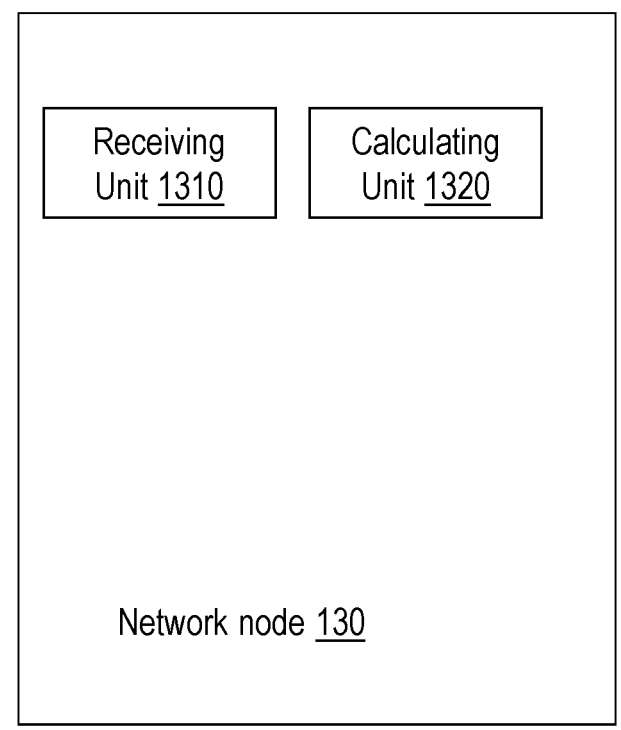

To perform the action as mentioned above, the network node 130 may comprise the arrangement as shown in FIG. 13 a and b. The network node 130 is configured to position a radio device 120, wherein a transmitting radio node 110 is adapted to transmit a first signal to be received by the radio device 120 and one or more receiving radio nodes 111, 112, 113.

The network node 110, 130 may comprise a respective input and output interface 500 configured to communicate with the transmitting radio node 110 and with the one or more receiving radio nodes 111, 112, 113, see FIG. 13a. The input and output interface 500 may comprise a wireless receiver not shown and a wireless transmitter not shown.

The network node 130 is further configured to, e.g. by means of a receiving unit 1310 in the network node 130, receive from each of the one or more receiving radio nodes 111, 112, 113, a calculated TDOA. The calculated TDOA is adapted to be based on:
- A measured time of arrival of the first signal is adapted to be received by the receiving radio node 111, 112, 113 from the transmitting radio node 110, and
- a measured time of arrival of a second signal, wherein the second signal is adapted to be the first signal that has been scattered and frequency modulated by the radio device 120 when the first signal was received by the radio device 120 from the transmitting radio node 110.

In some embodiments, the scattered first signal is adapted to have been frequency modulated to embed the identity of the radio device 120 enabling to resolve the identity of the radio device 120 when positioned.

The frequency modulated scattered first signal may be adapted to be represented by a Doppler modulated scattered first signal.

In some embodiments, the radio device 120 further is configured with a modulating frequency that is different compared to other radio devices, enabling the network node 130 to distinguish the radio device 120 from the other radio devices.

The network node 130 is further configured to, e.g. by means of a calculating unit 1320 in the network node 130, calculate the position of the radio device 120 based on the received one or more measured TDOAs.

Each calculated TDOA may be adapted to result in an ellipse, and wherein the one or more ellipses are adapted to intersect at the position of the radio device 120.

The embodiments herein may be implemented through a respective processor or one or more processors, such as a respective processor 1150, 1240, 1330 of a respective processing circuitry in the respective receiving radio node 111, radio device 120 and network node 130, depicted in respective FIGS. 11a, 12a and 13a, together with respective computer program code for performing the functions and actions of the embodiments herein. The program code mentioned above may also be provided as a computer program product, for instance in the form of a data carrier carrying computer program code for performing the embodiments herein when being loaded into the respective receiving radio node 111, radio device 120 and network node 130. One such carrier may be in the form of a CD ROM disc. It is however feasible with other data carriers such as a memory stick. The computer program code may furthermore be provided as pure program code on a server and downloaded to the respective receiving radio node 111, radio device 120 and network node 130.

The network node 110, 130 may further comprise a respective memory 1160, 1250, 1340 comprising one or more respective memory units. Each respective memory 1160, 1250, 1340 comprises instructions executable by the processor 1150, 1240, 1330 in the respective receiving radio node 111, radio device 120 and network node 130.

Each respective memory 1160, 1250, 1340 is arranged to be used to store measurements, calculations, positions, requirements, information, data, configurations, and applications to perform the methods herein when being executed in the respective receiving radio node 111, radio device 120 and network node 130.

In some embodiments, a respective computer program 1170, 1260, 1350 comprises instructions, which when executed by the at least one processor 1150, 1240, 1330, cause the at least one processor 1150, 1240, 1330 of the respective receiving radio node 111, radio device 120 and network node 130 to perform the actions above.

In some embodiments, a respective carrier 1180, 1270, 1360 comprises the respective computer program 1170, 1260, 1350, wherein the carrier 1180, 1270, 1360 is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the respective receiving radio node 111, radio device 120 and network node 130, that when executed by the respective one or more processors such as the processors or processor circuitry described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Further Extensions and Variations

Figure 14:
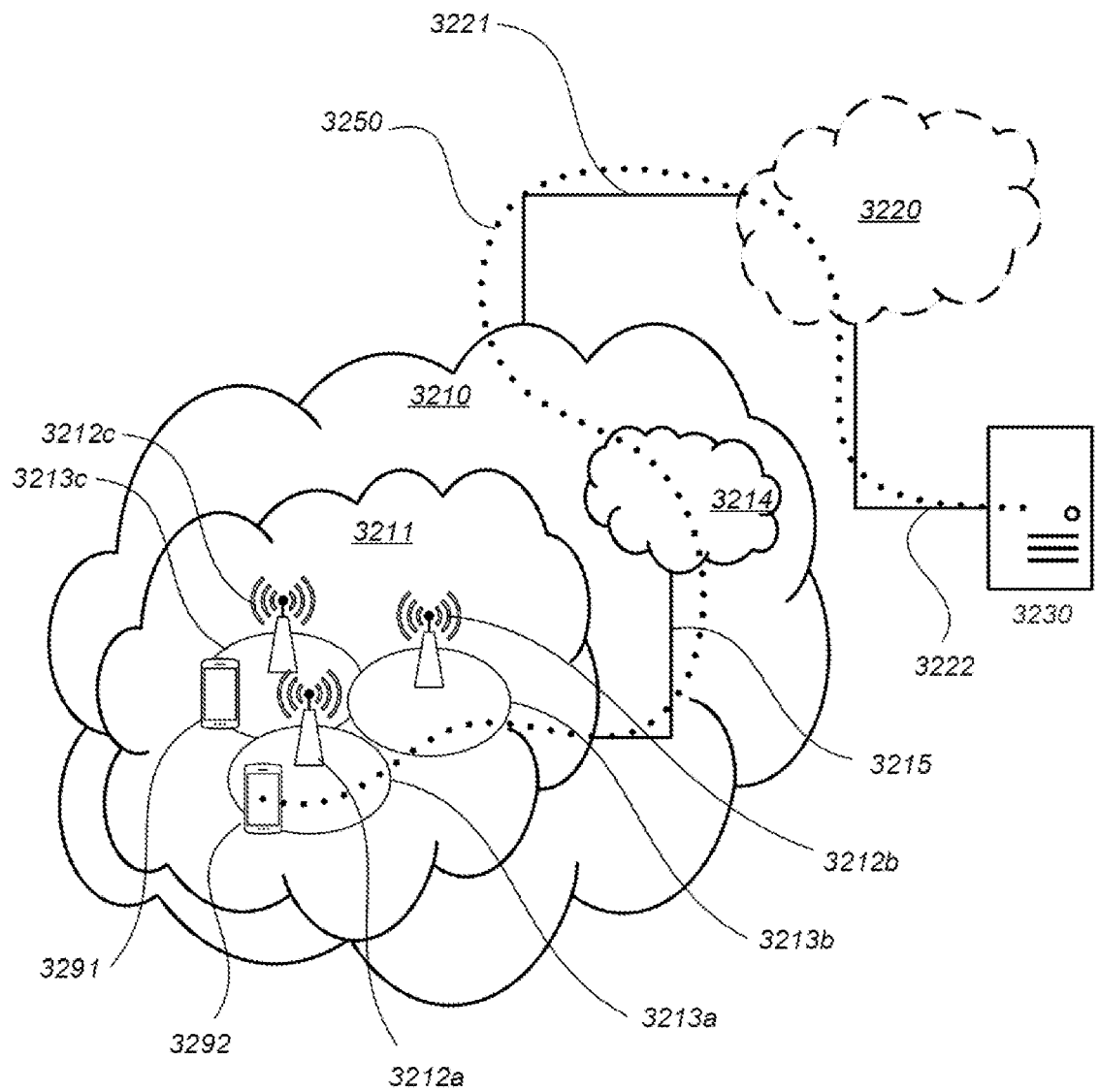
FIG. 14 schematically illustrates a telecommunication network connected via an intermediate network to a host computer.

With reference to FIG. 14, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the transmitting network node 110, the receiving network nodes 111, 112, 113, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the radio device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 15:
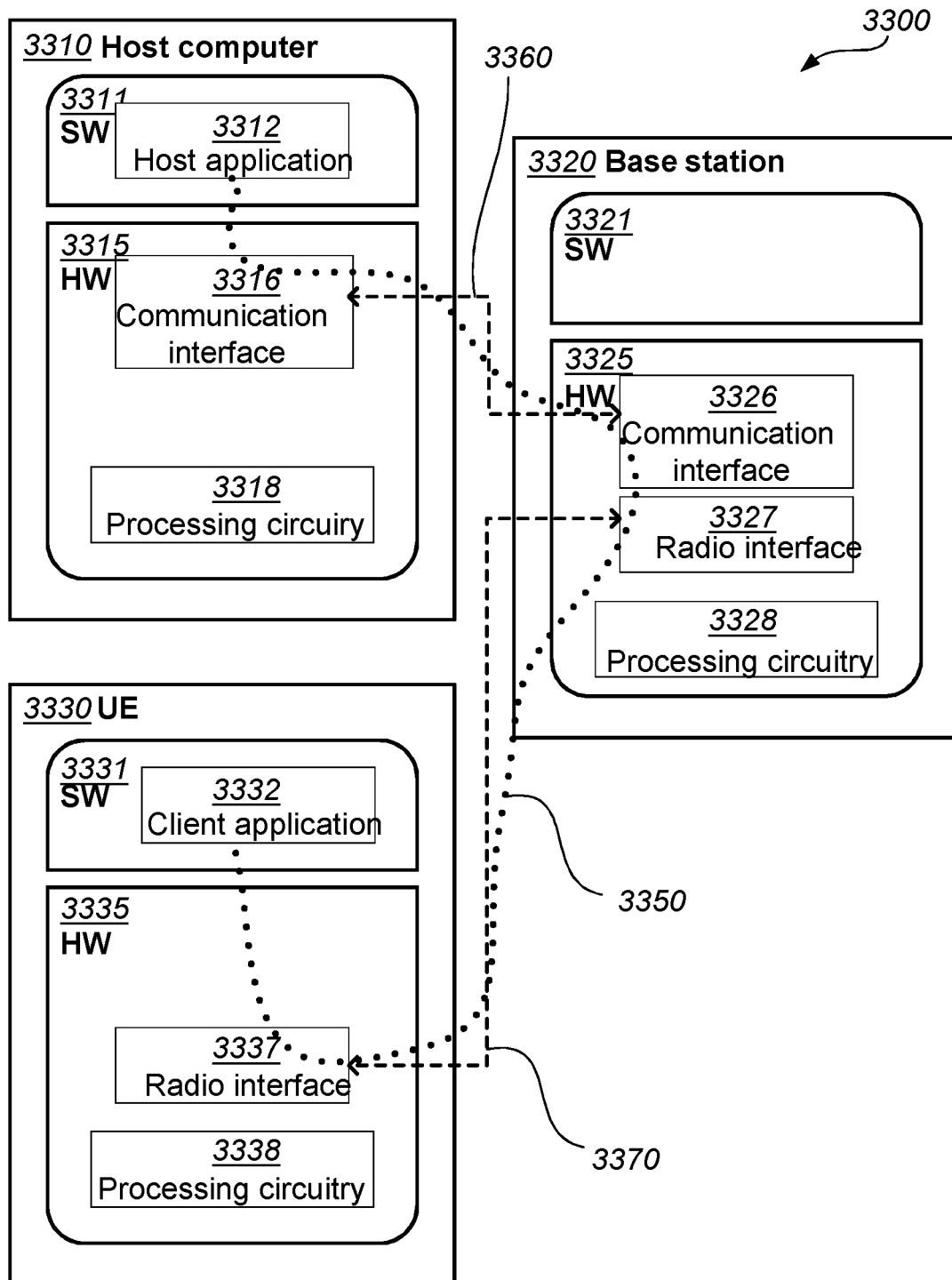
FIG. 15 is a generalized block diagram of a host computer communicating via a base station with a user equipment over a partially wireless connection.

It is noted that the host computer 3310, base station 3320 and UE 3330 illustrated in FIG. 15 may be identical to the host computer 3230, one of the base stations 3212a, 3212b, 3212c and one of the UEs 3291, 3292 of FIG. 16, respectively. This to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 16 is a flowchart illustrating a method implemented in a communication system, in accordance with one embodiment. The communication system includes a host computer, a base station such as the network node 110, and a UE such as the UE 120, which may be those described with reference to FIG. 14 and FIG. 15. For simplicity of the present disclosure, only drawing references to FIG. 16 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 17 is a flowchart illustrating a method implemented in a communication system, in accordance with one embodiment. The communication system includes a host computer, a base station such as an AP STA, and a UE such as a Non-AP STA which may be those described with reference to FIG. 14 and FIG. 15. For simplicity of the present disclosure, only drawing references to FIG. 17 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 18 is a flowchart illustrating a method implemented in a communication system, in accordance with one embodiment. The communication system includes a host computer, a base station such as an AP STA, and a UE such as a Non-AP STA which may be those described with reference to FIG. 14 and FIG. 15. For simplicity of the present disclosure, only drawing references to FIG. 18 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station such as an AP STA, and a UE such as a Non-AP STA which may be those described with reference to FIG. 14 and FIG. 15. For simplicity of the present disclosure, only drawing references to FIG. 19 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a receiving radio node for positioning a radio device, the method comprising:
   receiving a first signal from a transmitting radio node, which first signal is also received by a radio device;
   measuring a time of arrival of the first signal;
   receiving a second signal from the radio device,
      wherein the second signal is the first signal that has been scattered and frequency modulated by the radio device when the first signal was received by the radio device from the transmitting radio node;
   measuring a time of arrival of the second signal; and
   calculating a Time Difference Of Arrival (TDOA) based on the measured time of arrival of the first signal and the measured time of arrival of the second signal, wherein the calculated TDOA enables resolving the position of the radio device.

2. The method according to claim 1, wherein the scattered first signal has been frequency modulated to embed an identity of the radio device enabling to resolve the identity of the radio device when positioned.

3. The method according to claim 1, wherein the position of the radio device is resolved by performing any one out of:
   calculating the position of the radio device based on the measured TDOA, or
   sending the measured TDOA to a network node for calculating the position of the radio device.

4. The method according to claim 1, wherein calculating the TDOA results in an ellipse indicating the position of the radio device.

5. The method according to claim 1, wherein the frequency modulated scattered first signal is represented by a Doppler modulated scattered first signal.

6. The method according to claim 1, wherein the radio device is configured with a modulating frequency that is different compared to other radio devices enabling to distinguish the radio device from the other radio devices.

7. A method performed by a radio device for enabling positioning of the radio device, the method comprising:
   receiving a first signal from a transmitting radio node, which first signal is also received by a receiving radio node;
   scattering the first signal and frequency modulating the scattered first signal resulting in a second signal;
   sending the scattered and frequency modulated second signal to a respective one or more receiving radio nodes,
      wherein the sent scattered and frequency modulated second signal enables each respective receiving radio node to calculate a respective Time Difference Of Arrival (TDOA) for positioning the radio device based on:
      a time of arrival measured on the first signal received in the receiving radio node from the transmitting radio node; and
      a time of arrival measured on the scattered and frequency modulated second signal.

8. The method according to claim 7, wherein frequency modulating the scattered first signal is performed to embed the identity of the radio device enabling to resolve the identity of the radio device when positioned.

9. The method according to claim 7, wherein frequency modulating the scattered first signal comprises Doppler modulating the scattered first signal.

10. The method according to claim 7, wherein the radio device is configured with a different modulating frequency compared to other radio devices enabling to distinguish the radio device from the other radio devices.

11. A computer program stored on a non-transitory storage medium, when executed by a processor to perform actions according to claim 7.

12. A receiving radio node configured to position a radio device, the receiving radio node further being configured to:
receive a first signal from a transmitting radio node, which first signal is also adapted to be received by a radio device;
measure a time of arrival of the first signal;
receive a second signal from the radio device;
wherein the second signal is adapted to be the first signal that has been scattered and frequency modulated by the radio device when the first signal was received by the radio device from the transmitting radio node,
measure a time of arrival of the second signal; and
calculate a Time Difference Of Arrival (TDOA) based on the measured time of arrival of the first signal and the measured time of arrival of the second signal, wherein the calculated TDOA is adapted to enable resolve the position of the radio device.

13. The receiving radio node according to claim 12, wherein the scattered first signal is adapted to be frequency modulated to embed an identity of the radio device enabling to resolve the identity of the radio device when positioned.

14. The receiving radio node according to claim 12, further being configured to resolve the position of the radio device by performing any one out of:
calculate the position of the radio device based on the measured TDOA, or
send the measured TDOA to a network node for calculating the position of the radio device.

15. The receiving radio node according to claim 12, further being configured to calculate the TDOA resulting in an ellipse indicating the position of the radio device.

16. The receiving radio node according to claim 12, wherein the frequency modulated scattered first signal is represented by a Doppler modulated scattered first signal, and wherein the radio device is configured with a modulating frequency that is different compared to other radio devices enabling to distinguish the radio device from the other radio devices.

17. The receiving radio node according to claim 12, wherein the radio device is configured with a modulating frequency that is different compared to other radio devices, enabling to distinguish the radio device from the other radio devices.

* * * * *